United States Patent
Yang et al.

(10) Patent No.: US 8,643,780 B2
(45) Date of Patent: Feb. 4, 2014

(54) APPARATUS AND METHOD FOR DETECTING VERTICAL BLANKING INTERVAL

(75) Inventors: Yi-Le Yang, Hsinchu (TW); Ming-Feng Chou, Jhubei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1557 days.

(21) Appl. No.: 11/466,462

(22) Filed: Aug. 23, 2006

(65) Prior Publication Data

US 2007/0008425 A1    Jan. 11, 2007

Related U.S. Application Data

(63) Continuation-in-part of application No. 11/476,219, filed on Jun. 28, 2006.

(30) Foreign Application Priority Data

Jun. 28, 2005 (TW) ................................ 94121572 A
Aug. 23, 2005 (TW) ................................ 94128706 A

(51) Int. Cl.
*H04N 7/00*    (2011.01)
*H04N 11/00*    (2006.01)

(52) U.S. Cl.
USPC ............................ 348/465; 348/468; 348/478

(58) Field of Classification Search
USPC ......... 348/465–468, 461, 478, 464, 473, 477, 348/479, 547, 609, 572–573
IPC ................................................ H04N 7/00,11/00
See application file for complete search history.

(56) References Cited

U.S. PATENT DOCUMENTS

| | | | | |
|---|---|---|---|---|
| 3,581,192 | A * | 5/1971 | Miura et al. ................ | 324/76.31 |
| 5,835,153 | A * | 11/1998 | Pratt et al. ...................... | 348/468 |
| 6,239,843 | B1 * | 5/2001 | Gaudreau ...................... | 348/465 |
| 6,377,308 | B1 * | 4/2002 | Cahill, III ..................... | 348/461 |
| 6,381,287 | B1 * | 4/2002 | Shin .............................. | 375/316 |
| 6,577,348 | B1 * | 6/2003 | Park .............................. | 348/554 |
| 6,789,124 | B1 * | 9/2004 | Nasuti et al. .................. | 709/236 |
| 6,839,091 | B1 * | 1/2005 | Hebbalalu et al. ............ | 348/465 |
| 7,599,003 | B2 * | 10/2009 | Suzuki et al. ................. | 348/465 |
| 2003/0184677 | A1 * | 10/2003 | Kuzumoto et al. ........... | 348/465 |

* cited by examiner

*Primary Examiner* — Trang U Tran
(74) *Attorney, Agent, or Firm* — McClure, Qualey & Rodack, LLP

(57) ABSTRACT

An apparatus and method for detecting vertical blanking interval (VBI) is disclosed. The apparatus can automatically detect the presence and type of a VBI signal, so as to perform corresponding VBI decoding subsequently. The apparatus includes a digitizing module and a detecting module. The digitizing module converts a television signal into a digital signal according to a level value. The detecting module detects if the digital signal includes a VBI signal, and if yes, further determines the type of the VBI signal.

20 Claims, 4 Drawing Sheets

| VBI type | CC | TTX625B | WSS | VPS | CGMS |
|---|---|---|---|---|---|
| frame code | 001b | 27h | 1E3C1Fh | 1599h | 10b |

APPARATUS AND METHOD FOR DETECTING VERTICAL BLANKING INTERVAL

This application is a continuation-in-part of application Ser. No. 11/476,219, filed Jun. 28, 2006, which is hereby incorporated by reference. This application claims the benefit of Taiwan application Serial No. 094128706, filed Aug. 23, 2005, which is incorporated herein by reference.

BACKGROUND OF INVENTION

1. Field of the Invention

The present invention relates to the vertical blanking interval (VBI) of TV signal, and more particularly, to an apparatus and method for detecting the vertical blanking interval of TV signal.

2. Description of the Prior Art

The vertical blanking interval (VBI) is a blank interval reserved in a TV signal for the attachment of all kinds of information. FIG. 1 shows the positions of scan lines for the VBI in different TV specifications. In the National Television System Committee (NTSC) system, each video frame has 525 scan lines; in the Phase Alternating Line (PAL) system, each video frame has 625 scan lines. FIG. 1 illustrates the scan line numbers for Closed Caption (CC), Copy Generation Management System (CGMS), Wildscreen Signaling (WSS), Video Programming System (VPS), and Teletext (TTX) 625B.

FIG. 2 is a schematic diagram of a typical VBI signal. As shown, the VBI signal contained in a scan line comprises the following portions: horizontal synchronization (Hsync) signal, color burst signal, clock run-in signal, frame code and data. Different VBI types correspond to different clock run-in signals and frame codes. A conventional VBI decoder is configured according to scan lines positions of a VBI signal within the TV signal. For example, VBI decoding is set to start when the scan line at a certain position is received. Further, for different scan lines containing different VBI signals, the conventional VBI decoder needs to respectively preset the parameters associated with each different VBI type in order to perform VBI decoding accurately.

Therefore, the conventional VBI decoder needs to know in advance which scan line position contains a VBI signal and which VBI type the VBI signal belongs to, and preset the associated parameters required for a subsequent VBI decoding process. Thus, the conventional VBI decoder is very inconvenient and inflexible for use.

SUMMARY OF INVENTION

It is therefore one objective of the present invention to provide a VBI detection apparatus and method which can automatically detect the presence and type of a VBI signal for use in a subsequent VBI decoding process.

Another objective of the present invention is to provide a VBI detection apparatus and method which can automatically detect a VBI signal at any scan line position without knowing in advance which scan line position contains the VBI signal.

An embodiment of this invention discloses an apparatus for detecting a VBI signal in a television signal. The apparatus comprises: a digitizing module for converting the television signal into a digital signal according to a level value; and a detecting module, coupled to the digitizing module, for detecting the digital signal to determine whether the VBI signal exists or not, and determining a VBI type of the VBI signal when the VBI signal exists.

Another embodiment of this invention discloses a method for detecting a VBI signal in a television signal. The method comprises: converting the television signal into a digital signal according to a level value; determining whether the digital signal includes the VBI signal; and determining a VBI type of the VBI signal when the digital signal includes the VBI signal.

DETAILED DESCRIPTION

Figures 1, 2:
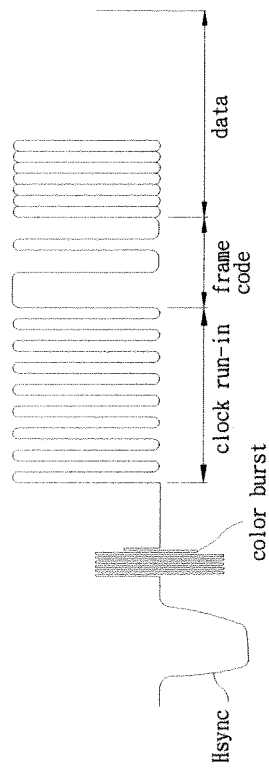
FIG. 1 shows the positions of scan lines for various VBI types.
FIG. 2 is a schematic diagram of a typical VBI signal.
Figures 3, 4:
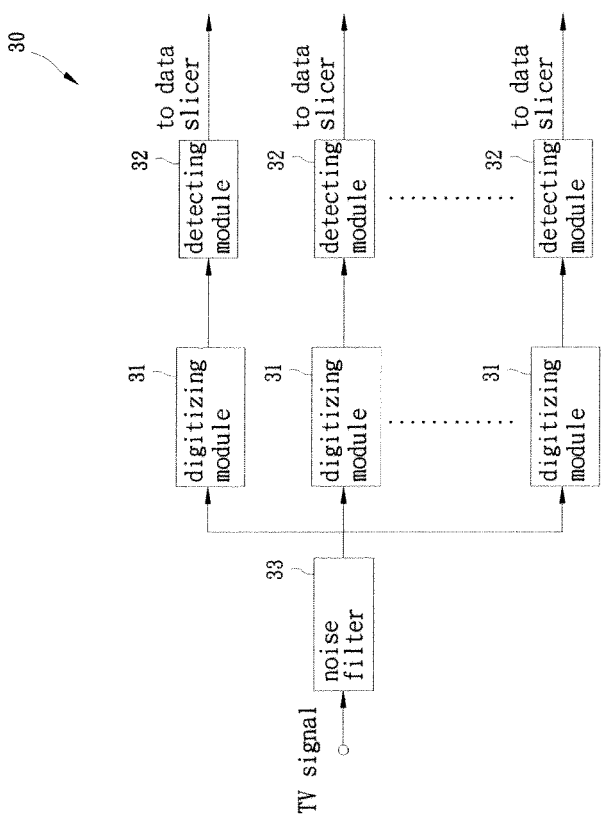
FIG. 3 shows a block diagram of a VBI detection apparatus according to an embodiment of this invention.
FIG. 4 shows frame codes of various VBI types.

FIG. 3 shows a block diagram of a VBI detection apparatus 30 according to an embodiment of this invention. The VBI detection apparatus 30 automatically detects various VBI signals at any scan line position of television signals, and identifies types of the VBI signals, such as CC, CGMS, WSS, VPS, TTX625B, etc. As shown in FIG. 3, the VBI detection apparatus 30 includes a plurality of digitizing modules 31, a plurality of detecting modules 32, and a noise filter 33. The noise filter 33 receives a television signal, eliminates high frequency noise signals therein, and feeds the filtered TV signal into the digitizing modules 31. The television signal can be a CVBS signal, Y/C signal, VGA signal, or Y/Pb/Pr signal. Then, each of the digitizing modules 31 digitizes the filtered television signal according to a level value corresponding to a certain VBI type and generates a corresponding digital signal. In other words, the value of the digital signal is taken as 1 if the filtered television signal is higher than the level value, and taken as 0 if otherwise. The manner for determining the level value is not limited. Thus, the level value can be a pre-determined value, or a value dynamically adjusted according to a received television signal. For example, if the received television signal includes a frame code, the level value can be determined according to signal intensity corresponding to the frame code. In an embodiment, the plurality of digitizing modules 31 are integrated into one module for converting the filtered television signal into a digital signal according to a pre-determined fixed level value or a dynamically adjusted level value.

In FIG. 3, the plurality of detecting modules 32 receive the digital signals from the digitizing modules 31, and detect if a frame code is contained therein. If any frame code is detected, the detected frame code is further compared with frame codes of various VBI types. Frame codes of common VBI types are shown in FIG. 4, where b represents binary values and h represents hexadecimal values. After the comparison, if the detected frame code matches the frame code of any VBI type (not limited to those listed in FIG. 4), the detecting module 32 determines that the received television signal includes a VBI signal and also identifies the type of the VBI signal. If the television signal includes the VBI signal, the VBI signal is then delivered to a data slicer, which is not shown in FIG. 3, for subsequent processing. It is notable that in FIG. 3, the numbers of the digitizing modules 31 and detecting modules 32 depend on the VBI types to be detected. In an embodiment, one digitizing module 31 and one detecting module 32 are used to detect one or several specific types of VBI signals.

The embodiment in FIG. 3 shows that in the whole operation of the VBI detecting apparatus 30, there is no need to differentiate the scan line position of the received television signal. The VBI signal (and its type) is automatically identified at any scan line position in the manner described above. In addition, the detecting module 32 performs the detection according to a preset time determined according to the VBI type to be detected. For example, the detecting module 32 can be coupled to a counter (not shown), which can be triggered and reset by a horizontal synchronization (HSYNC) signal of the television signal so as to start counting the pulse number of a reference clock. When the counter counts to a specific pulse number correspondent to the VBI type to be detected, the counter sends a control signal to the detecting module 32 to initiate the detection.

Figure 5:
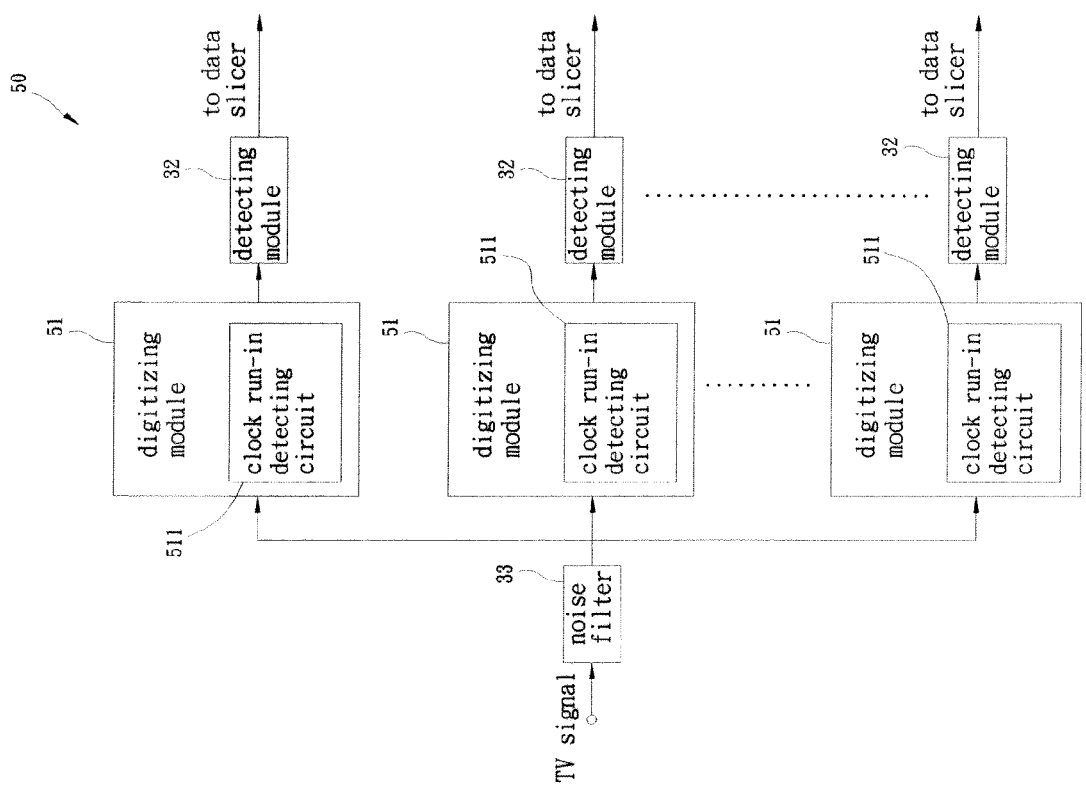
FIG. 5 shows a block diagram of a VBI detection apparatus according to a preferred embodiment of this invention.

FIG. 5 shows a block diagram of a VBI detection apparatus 50 according to a preferred embodiment of this invention. Compared with the embodiment shown in FIG. 3, the major difference is that in the VBI detection apparatus 50, each digitizing module 51 includes a clock run-in detecting circuit 511 for detecting if a television signal includes a clock run-in signal. If the television signal includes the clock run-in signal, the television signal may include a VBI signal and the digitizing module 51 will then convert the television signal into a digital signal. It needs to be noticed that a television signal not including a clock run-in signal can still contain a VBI signal, such as CGMS signal. Therefore, in FIG. 5, a digitizing module without the clock run-in detecting circuit 511 can be used for the VBI type without the clock run-in signal. In an embodiment, the clock run-in detecting circuit 511 includes a first detecting unit and a computing unit. The first detecting unit generates a detecting signal according to the television signal and the computing unit calculates a slop of this detecting signal so as to determine if a clock run-in signal is embedded in the TV signal. Moreover, according to the clock run-in signal, the first detecting unit can lock a DC voltage value for use as a level value for the digitizing module 51. For example, the level value can be determined according to the voltage values of the clock run-in signal corresponding to logic "1" and logic "0". The principle and operation of the first detecting unit and the computing unit has been disclosed in U.S. patent application Ser. No. 11/476,219, owned by the assignee of this invention, filed on Jun. 28, 2006, and entitled "APPARATUS AND METHOD FOR DETECTING VERTICAL BLANKING INTERVAL" which is incorporated herein by reference.

Figure 6:
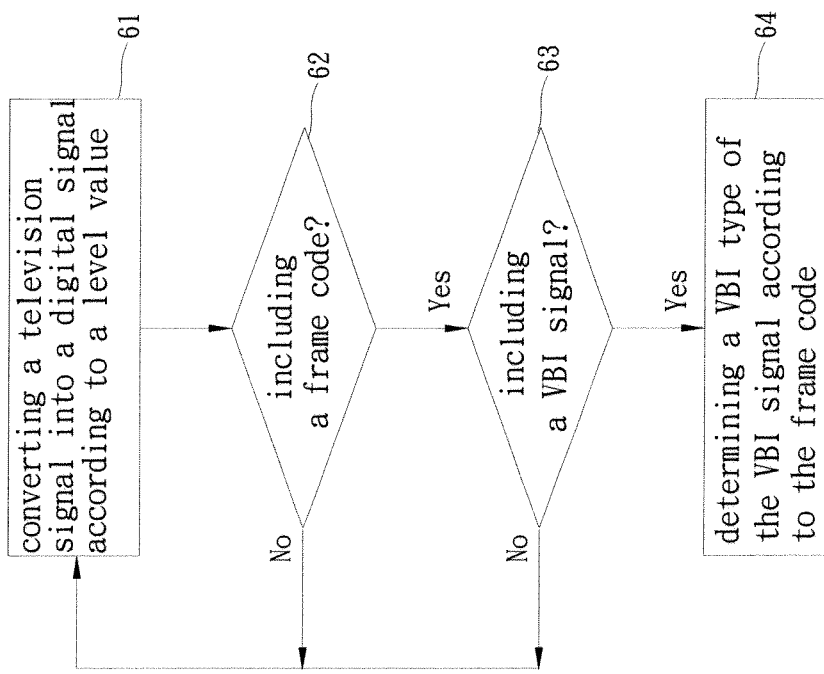
FIG. 6 shows a flow chart of a VBI detection method according to a preferred embodiment of this invention.

FIG. 6 shows a flow chart of a preferred embodiment of a VBI detection method according to this invention. As shown in FIG. 6, the following steps are included:

Step 61: converting a television signal into a digital signal according to a level value;

Step 62: detecting if the digital signal includes a frame code, if yes then proceeding to step 63, otherwise returning to step 61;

Step 63: determining if the television signal includes a VBI signal according to the frame code, if yes then proceeding to step 64, otherwise returning to step 61;

Step 64: determining a VBI type of the VBI signal according to the frame code.

In an embodiment of this invention, before executing step 61, it is determined if the television signal includes a clock run-in signal. If yes, it means that the television signal possibly includes a VBI signal, and then step 61 is executed. In another embodiment, a detecting signal is generated according to the television signal, and a slope of the detecting signal is calculated so as to determine whether the television signal includes a clock run-in signal. If the television signal is determined to include the clock run-in signal, the level value for step 61 is determined according to a DC voltage value locked according to the clock run-in signal. For example, the level value can be determined according to the voltage values of the clock run-in signal corresponding to logic "1" and logic "0".

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. An apparatus for detecting a vertical blanking interval (VBI) signal in a television signal, the apparatus comprising:
a digitizing module for converting the television signal into a digital signal according to a comparison of the television signal with a level value corresponding to a VBI type, the level value based on an intensity value of a frame code; and
a detecting module, coupled to the digitizing module, for detecting the digital signal to determine whether the VBI signal exists or not, and determining the VBI type of the VBI signal when the VBI signal exists.

2. The apparatus of claim 1, wherein the detecting module detects whether the digital signal includes the frame code so as to determine whether the television signal includes the VBI signal.

3. The apparatus of claim 2, wherein the detecting module determines the VBI type of the VBI signal according to the frame code.

4. The apparatus of claim 3, wherein the VBI type is one of Closed Caption, Copy Generation Management System, Widescreen Signaling, Video Programming System, or Teletext.

5. The apparatus of claim 1, wherein the television signal is one of a CVBS signal, a Y/C signal, a VGA signal or a Y/Pb/Pr signal.

6. The apparatus of claim 1, wherein the digitizing module comprises: a clock run-in detecting circuit, for determining whether the television signal includes a clock run-in signal.

7. The apparatus of claim 6, wherein the digitizing module converts the television signal into the digital signal in response to the television signal including the clock run-in signal.

8. The apparatus of claim 1, further comprising: a noise filter for filtering out a noise of the television signal and outputting the filtered television signal to the digitizing module.

9. The apparatus of claim 1, wherein the detecting module detects the digital signal according to a predetermined time.

10. The apparatus of claim 1, wherein the television signal does not include a clock run-in signal.

11. The apparatus of claim 1, wherein the level value is dynamically adjusted depending on the intensity value of the frame code.

12. A method for detecting a VBI signal in a television signal, the method comprising:
converting the television signal into a digital signal according to a comparison of the television signal with a level value corresponding to a VBI type, the level value based on an intensity value of a frame code;

determining whether the digital signal includes the VBI signal, the determining occurring without requiring advance knowledge of a scan line position corresponding to the VBI signal; and determining the VBI type of the VBI signal when the digital signal includes the VBI signal.

13. The method of claim 12, wherein whether the digital signal includes the VBI signal is determined according to whether the digital signal includes the frame code.

14. The method of claim 13, wherein the VBI type of the VBI signal is determined according to the frame code when the digital signal includes the VBI signal.

15. The method of claim 14, wherein the VBI type is one of Closed Caption, Copy Generation Management System, Widescreen Signaling, Video Programming System, or Teletext.

16. The method of claim 12, wherein the television signal is one of a CVBS signal, a Y/C signal, a VGA signal or a Y/Pb/Pr signal.

17. The method of claim 12, further comprising:
detecting whether the television signal includes a clock run-in signal;
wherein the converting step is performed in response to the television signal including the clock run-in signal.

18. The method of claim 12, wherein the step of determining whether the digital signal includes the VBI signal is performed according to a predetermined time.

19. The method of claim 12, wherein the television signal does not include a clock run-in signal.

20. The method of claim 12, further comprising dynamically adjusting the level value based on the intensity value of the frame code.

* * * * *